US006498614B1

(12) United States Patent
Amari et al.

(10) Patent No.: US 6,498,614 B1
(45) Date of Patent: Dec. 24, 2002

(54) DISPLAY SCREEN SWITCH

(75) Inventors: Takeyuki Amari, Shizuoka (JP); Yoshiyuki Furuya, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/471,284

(22) Filed: Dec. 23, 1999

(30) Foreign Application Priority Data

Dec. 25, 1998 (JP) ............................................ 10-371600
Jun. 2, 1999 (JP) ............................................ 11-155381

(51) Int. Cl.[7] .............................. G09G 5/00; H04B 1/03
(52) U.S. Cl. ........................ 345/905; 345/170; 345/172; 345/173; 361/814
(58) Field of Search ................................ 345/172, 905, 345/173, 168, 156; 349/58; 361/814; 455/347; 369/75.1

(56) References Cited

U.S. PATENT DOCUMENTS

| | | | |
|---|---|---|---|
| 5,175,873 A | * 12/1992 | Goldenberg et al. | 455/89 |
| 5,867,149 A | * 2/1999 | Jeager | 345/172 |
| 6,169,719 B1 | * 1/2001 | Yamanaka et al. | 369/75.1 |
| 6,232,961 B1 | * 5/2001 | Kunimatsu et al. | 345/173 |
| 6,275,217 B1 | * 8/2001 | Jaeger | 345/172 |

FOREIGN PATENT DOCUMENTS

JP 5-182430 7/1993 ........... G11B/27/34

* cited by examiner

*Primary Examiner*—Bipin Shalwala
*Assistant Examiner*—David L Lewis
(74) *Attorney, Agent, or Firm*—Sughrue Mion, PLLC

(57) ABSTRACT

A display screen switch is disposed above a liquid-crystal display (16) that includes a display screen (16a) and is capable of displaying on the display screen (16a) an image that indicates various information comprising switch information. The switch includes a casing (22) disposed above the display screen (16a) and having a circuit. The casing (22) includes a plate-like casing body (25) disposed on the display screen (16a), and a transparent window portion (26) formed to penetrate the casing body (25) from a surface side to a reverse side thereof. The switch further includes a switch body (23) disposed on the casing body (25), the switch body (23) being connected to the circuit, and a transparent operation plate (24) disposed above the surface side of the casing body (25), the transparent operation plate (24) being depressed so as to operate the switch body (23). In the above switch, an image of switch information displayed on the display screen (16a) is transmitted to the transparent operation plate (24) through the transparent window portion (26) of the casing (22).

5 Claims, 17 Drawing Sheets

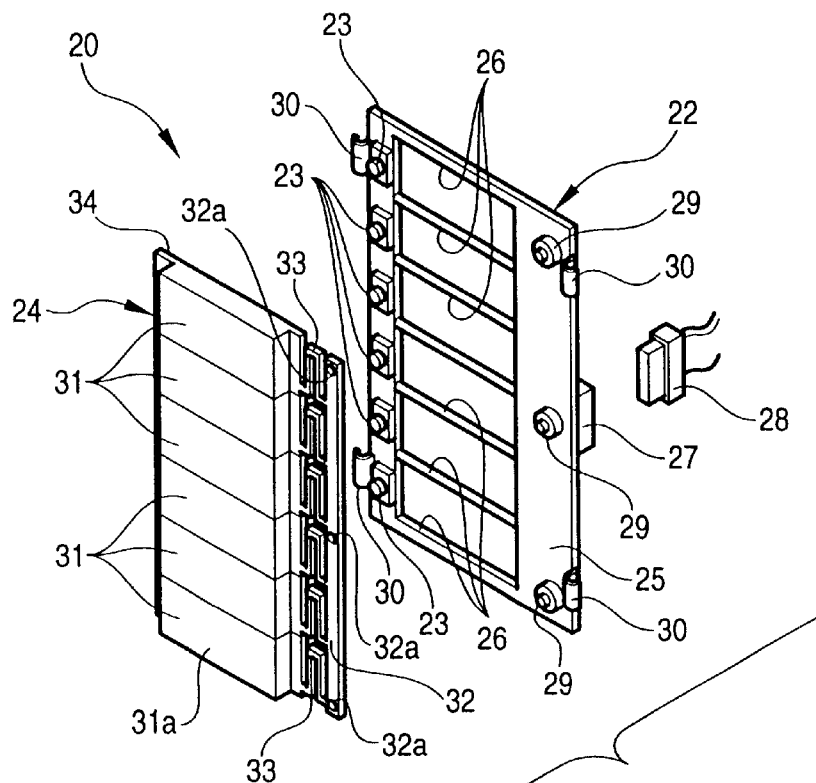
FIG. 4 (a)
FIG. 4 (b)
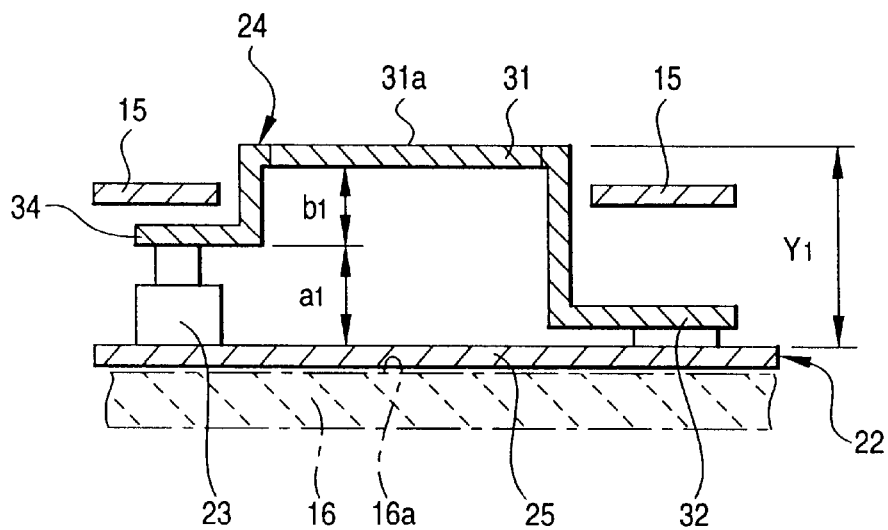

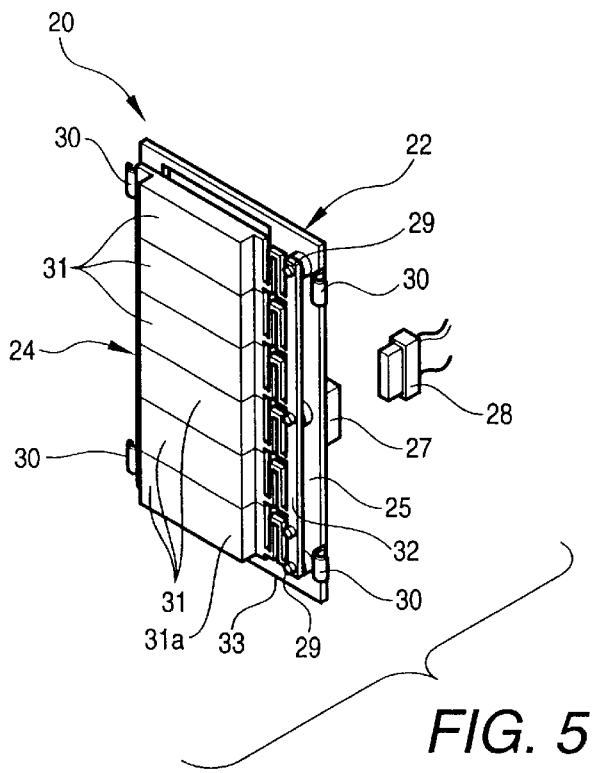
FIG. 5
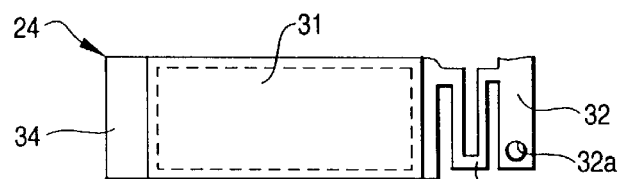
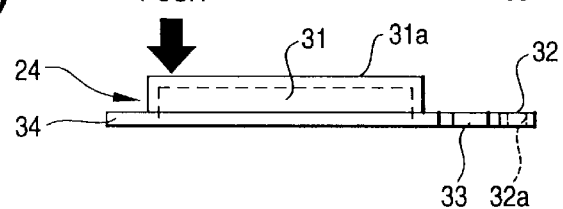

DISPLAY SCREEN SWITCH

BACKGROUND OF THE INVENTION

1. Field of the Invention

The present invention relates to a display screen switch which is operated above a display screen for displaying an image indicating switch information.

The present application is based on Japanese Patent Applications Nos. Hei. 10-371600 and 11-155381, the contents of which are incorporated herein by reference.

2. Description of the Related Art

FIG. 19 is a front view showing a related electric apparatus for a vehicle. Referring to FIG. 19, an operation panel 1 is secured to the front surface of a casing. A display unit 2 is disposed in the central portion of the operation panel 1. A variety of switches 3 are disposed around the display unit 2. The overall display screen of the display unit 2 serves as a display area 4. Various information are displayed on the display area 4 as an image. In accordance with, for example, displayed information, the switch 3 is operated.

In recent years an attempt has been made to realize a switch having a multiplicity of functions. Therefore, a display screen switch has been suggested which displays an image indicating switch information on the display screen of the display unit 2 and which is operated on the display screen. The display screen switch includes a touch-panel-type switch having a touch panel disposed on the display screen and arranged to be depressed and a contact-type switch including a transparent operation members provided for the display screen and arranged to be depressed to operate the switch. The touch panel switch has substantially no operation stroke when the depression is performed. Therefore, a satisfactory input feeling cannot be obtained. On the other hand, the switch incorporating the transparent operation members and the contact-type switches permits a sufficiently long operation stroke when the depression is performed. Therefore, the foregoing problem can be overcome.

The related display-screen switch incorporating the transparent operation members and the contact-type switch has a problem in that an image indicating switch information displayed on the display screen 2a cannot easily be viewed. That is, the distance L from the display screen 2a of the display unit 2 to the upper surface (key top) 5a of the transparent operation plate 5 is too long, as shown in FIG. 20. Therefore, when a surface on which usual characters have been printed serves as the upper surface (key top) 5a of the transparent operation plate, an image of switch information displayed on the display screen 2a is viewed far. Thus, this means only poor legibility.

SUMMARY OF THE INVENTION

In view of the foregoing, it is an object of the present invention to provide a display screen switch which is able to shorten the distance from the display screen to the key top and permits satisfactory legibility.

To achieve the above object, according to the first aspect of the present invention, there is provided a display screen switch disposed above a display device that includes a display screen and is capable of displaying on the display screen an image that indicates various information comprising switch information, the switch which includes a casing disposed above a display screen and having a circuit, the casing including a plate-like casing body disposed on the display screen and a transparent window portion formed to penetrate the casing body from a surface side to a reverse side thereof, a switch body disposed on the casing body, the switch body being connected to the circuit, and a transparent operation plate disposed above the surface side of the casing body, the transparent operation plate being depressed so as to operate the switch body, wherein an image of switch information displayed on the display screen is transmitted to the transparent operation plate through the transparent window portion of the casing. The foregoing display screen switch has the structure that the casing and the transparent operation plate, which are stacked, are disposed on the display screen of the display device. When the transparent operation plate is depressed, the switch body secured to the casing is operated. Therefore, the distance from the display screen to the transparent operation plate, which is the key top, can be shortened. As a result, a structure having a small thickness can be realized and an image of switch information displayed on the display screen can easily be viewed.

According to the second aspect of the present invention, it is preferable that the transparent operation plate includes a transparent display portion wherein the image of the switch information displayed on the display screen is transmitted through and also displayed on the transparent display portion, a secured portion disposed on one side of the transparent display portion and secured to the casing body, an elastic portion disposed between the secured portion and the transparent display portion, and a switch depression portion disposed on the other side of the transparent display portion and disposed above the switch body. In addition to the effect obtainable from the first aspect, the foregoing display screen switch has the structure that when the transparent display portion of the transparent operation plate is depressed, elastic deformation of the elastic portion causes the switch depression portion to press the switch body. After the pressure has been suspended, elastic restoring deformation of the elastic portion causes the switch body to be returned. Since the elastic portion serving as a restoring device is provided on either side of the transparent display portion, a necessity for interposing a restoring device between the transparent operation plate and the casing can be eliminated. Therefore, the transparent-operation plate can be disposed adjacent to the casing. Hence it follows that an image of switch information displayed on the display screen can furthermore easily be viewed.

According to the third aspect of the present invention, it is preferable that a plurality of the transparent window portions are provided in the casing body, a plurality of the transparent operation plates corresponding to the plural transparent window portions are integrally formed together, and a plurality of the switch bodies arranged to be operated by the plural transparent operation plates are provided. In addition to the effects obtainable from the first and second aspects, the display screen switch including the plural transparent operation plates and the corresponding switch bodies permits a plurality of inputs.

According to the fourth aspect of the present invention, it is preferable that the switch depression portion and the transparent display portion are substantially same in height from the casing body. In addition to the effects obtainable from the second aspect or the third aspect, the distance from the casing to the transparent display portion can be made to be substantially the same height as that of the switch body. As a result, a structure having a small thickness can be realized and an image of switch information displayed on the display screen can furthermore easily be viewed.

According to the fifth aspect of the present invention, it is preferable that the transparent operation plate includes a transparent display portion wherein the image of the switch information is transmitted through and displayed on the transparent display portion, a switch depression portion disposed on one side of the transparent display portion and disposed above the switch body, and a flange portion formed around the transparent display portion and the switch depression portion, and the switch further comprises a cover disposed above the casing wherein the transparent operation plate is disposed between the cover and the casing while the transparent display portion and the switch depression portion are projected through an opening for the operation plate of the cover, and an elastic member is interposed between the transparent operation plate and the casing around the transparent operation plate, wherein the elastic member is brought into hermetic contact with the transparent operation plate due to elastic reactive force of the elastic member. In addition to the effect obtainable from the first aspect, when the switch depression portion of the transparent operation plate is depressed, the elastic member is elastically deformed in the downward direction. Thus, the switch body is operated. When the depression of the switch depression portion is inhibited, the elastic restoring deformation of the elastic member causes the switch depression portion to be returned to the original position. The elastic member is disposed below the overall outer surface of the transparent operation plate, the elastic member is being brought into hermetic contact with the transparent operation plate owing to the elastic reactive force of the elastic member. Therefore, introduction of dust, water or the like introduced through the opening of the cover operation plate can be prevented.

Other objects, features and advantages of the invention will be evident from the following detailed description of the preferred embodiments described in conjunction with the attached drawings.

BRIEF DESCRIPTION OF THE DRAWINGS

FIG. 4(a) is an exploded perspective view showing a display screen switch according to the first embodiment of the present invention and FIG. 4(b) is a cross sectional view showing the display screen switch according to the first embodiment of the present invention;

FIG. 5 is a perspective view showing a state of the assembled display screen switch according to the first embodiment of the present invention;

FIG. 6(a) is a plan view showing a transparent operation plate according to the first embodiment of the present invention and FIG. 6(b) is a front view showing the transparent operation plate according to the first embodiment of the present invention;

DETAILED DESCRIPTION OF THE PREFERRED EMBODIMENTS

Embodiments of the present invention will now be described with reference to the drawings.

Figure 1:
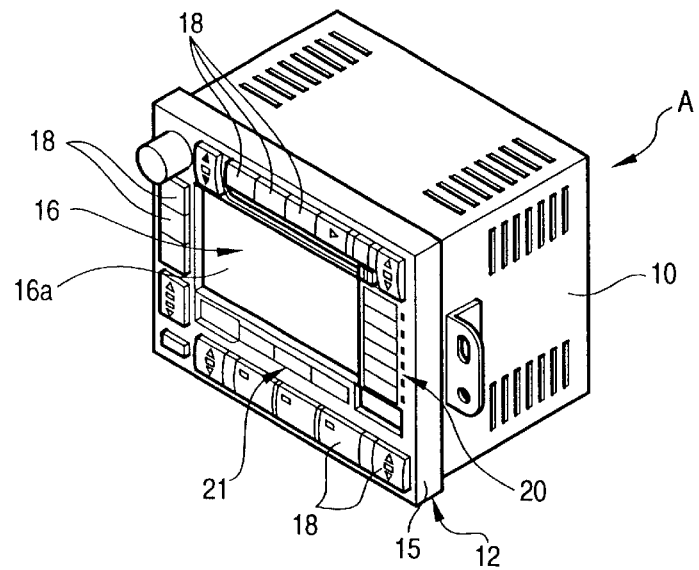
FIG. 1 is a perspective view showing an electric apparatus for a vehicle according to a first embodiment of the present invention.
Figure 2:
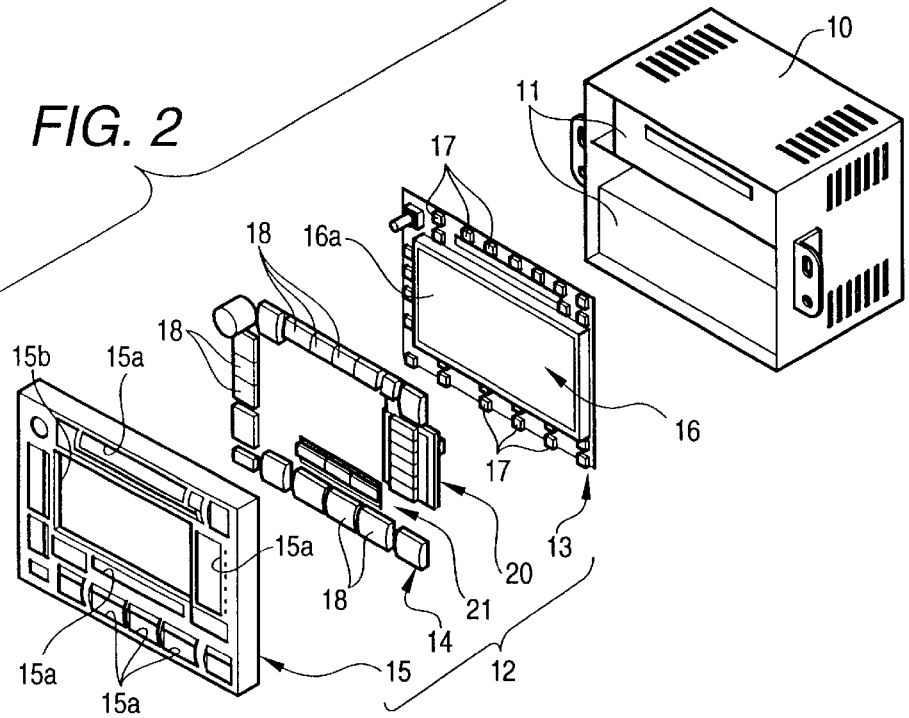
FIG. 2 is an exploded perspective view showing the electric apparatus for a vehicle according to the first embodiment of the present invention.
Figure 3:
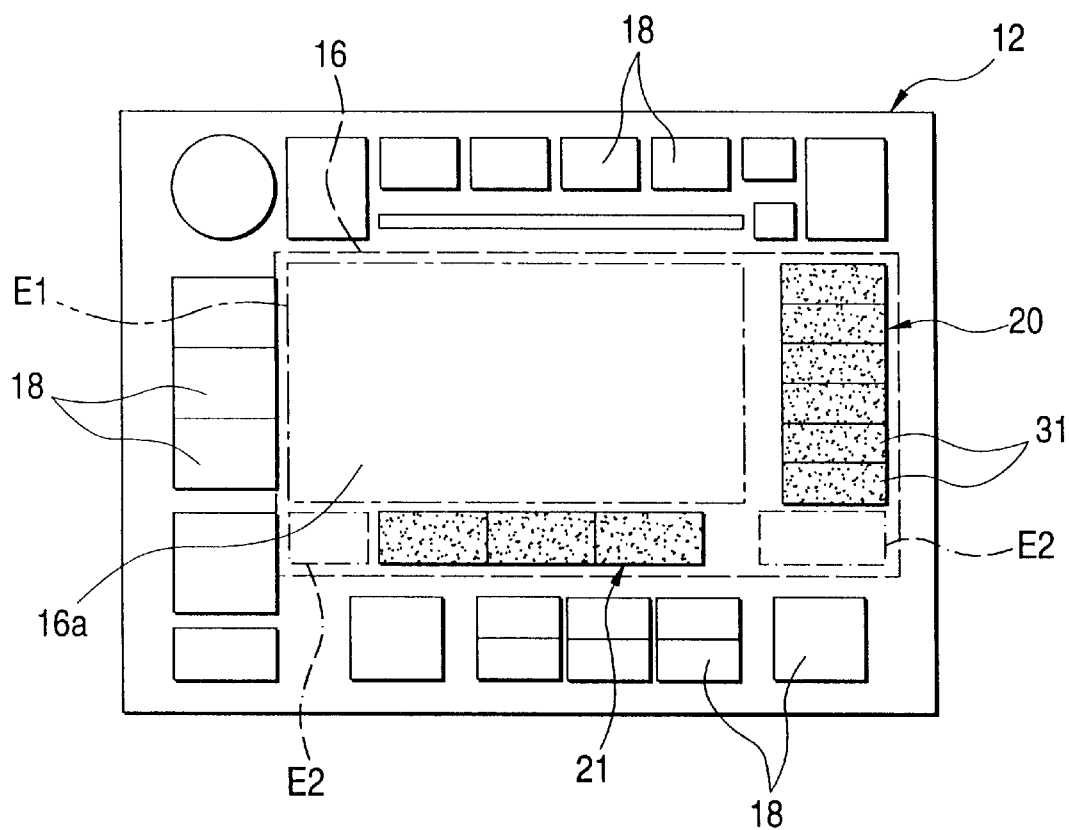
FIG. 3 is a front view showing the electric apparatus for a vehicle according to the first embodiment of the present invention.
Figure 7:
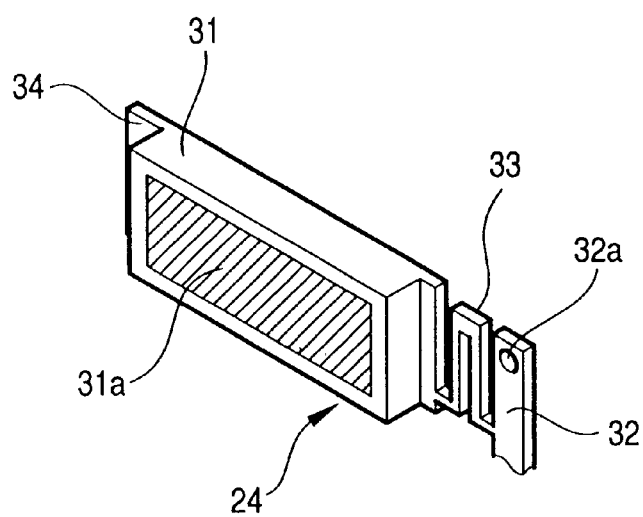
FIG. 7 is a perspective view showing the transparent operation plate according to the first embodiment of the present invention.

FIGS. 1 to 7 show a first embodiment of the present invention. In the first embodiment, the present invention is applied to a display screen switch for an electric apparatus for a vehicle. FIG. 1 is a perspective view showing an electric apparatus A for a vehicle. FIG. 2 is an exploded view showing the electric apparatus A for a vehicle. FIG. 3 is a front view showing the electric apparatus A for a vehicle. FIG. 4(a) is an exploded perspective view showing a display screen switch 20. FIG. 4(b) is a cross sectional view showing the display screen switch 20. FIG. 5 is a perspective view showing a assembled state of the display screen switch 20. FIG. 6(a) is a plan view showing a transparent operation plates 24. FIG. 6(b) is a front view showing the transparent operation plates 24. FIG. 7 is a perspective view showing the transparent operation plates 24.

Referring to FIGS. 1 to 7, the electric apparatus A for a vehicle comprises a metal plate casing 10 having an opened front surface and accommodating apparatuses 11, such as a CD player and a cassette unit. An operation panel 12 is secured to the front surface of the metal plate casing 10. The operation panel 12 includes a switch board 13, a switch operation member 14, display screen switches 20 and 21 and a face cover 15. The foregoing elements are laminated and disposed.

A liquid crystal display unit 16, which is a display device, is disposed on the surface of the switch board 13. A multiplicity of switch bodies 17 are disposed around the liquid crystal display unit 16. The liquid crystal display unit 16 is able to display an image of various information including switch information on a display screen 16a.

The switch operation member 14 is provided with switch operation portions 18 corresponding to the switch bodies 17. When each of the switch operation portions 18 is depressed, each of the switch bodies 17 is operated. The detailed structures of the display screen switches 20 and 21 will now be described.

The face cover 15 is provided with openings 15a for the switches at positions correspondingly to the switch operation portions 18. The switch operation portions 18 are exposed to the outside through the openings 15a for the switches. The face cover 15 has opening 15b for the display unit at that position correspondingly to the liquid crystal display unit 16. A portion of the display screen 16a of the liquid crystal display unit 16 is exposed to the outside through the opening 15b for the display unit. As shown in FIG. 3, the opening 15b for the display unit has the size which is smaller than the size of the liquid crystal display unit 16. A display area E1 of the liquid crystal display unit 16 is smaller than the size of the liquid crystal display unit 16.

A portion of the display screen 16a of the liquid crystal display unit 16 except for the display area E1 is formed into a resident display area E2. Information including a clock and the set temperature of an air conditioner which must always be displayed is displayed in the resident display area E2. The resident display is displayed at positions adjacent to the corresponding function zones. Moreover, optical systems (for example, a convergent type lenses) are used to enable display information to be viewed on this side with respect to the display screen 16a. Therefore, a user is permitted to view display information on this side different from the display position of the display screen 16a. Therefore, the resident display can easily be determined.

On the other hand, the display screen switches 20 and 21 are provided for the display screen 16a of the liquid crystal display unit 16 except for the display area E1 and the resident display area E2.

As shown in FIGS. 4(a), 4(b) and 5, the display screen switch 20 is formed into a module structure which includes a plate-like casing 22 disposed on the display screen 16a of the liquid crystal display unit 16, a plurality of switch bodies 23 secured to the casing 22 and a plurality of transparent operation plates 24 disposed above the surface side of the casing 22.

The casing 22 includes a plate-like casing body 25 disposed on the display screen 16a and a plurality of transparent window portions 26 formed to penetrate the casing body 25 from the surface side to the reverse side and arranged to permit transmission of an image of switch information displayed on the display screen 16a to the transparent operation plates 24.

The plural switch bodies 23 are secured to the casing body 25 at the positions correspondingly to the plural transparent window portions 26. Each of the switch bodies 23 has a contact in the form of a metal contact. A connector 27 is provided for the reverse side of the casing body 25. The connector 27 and the plural switch bodies 23 are electrically connected to one another through a circuit pattern (not shown) which is a circuit provided for the casing body 25. The connector 27 is connected to a connector 28 of the switch board 13. In this embodiment, the plural switch bodies 23, the circuit and the connector 27 are integrally molded with the casing 22. As a result, the thickness of the casing 22 is minimized.

Three operating engagement pins 29 are disposed on the surface side of the casing body 25. Moreover, four engagement claws 30 projecting over the surface side surface are provided for the two side ends of the casing body 25. The engagement claws 30 are engaged to engagement grooves (not shown) of the face cover 15 so that the display screen switch 20 is assembled to the face cover 15.

As shown in FIGS. 6(a), 6(b) and 7, each of the transparent operation plates 24 includes a transparent display portion 31 wherein an image of switch information is transmitted through and displayed on the transparent display portion 31, a secured portion 32 provided for either side of the transparent display portion 31, a plurality of elastic portions 33 interposed between the secured portion 32 and the plural transparent display portion 31 to connect the secured portion 32 and the transparent display portion 31 to one another and a switch depression portion 34 disposed on another side of the transparent display portion 31.

The transparent display portion 31 is formed of a transparent member to make the overall body to be a transparent structure. In this embodiment, portions except for the transmission portions, that is, the outer surface portion of the transparent display portion 31 is coated in order to prevent reflection of light from another portion and light leakage. A two-tone color structure may be employed in which the portions for permitting light transmission and the other portions are sectioned into a transparent member and a non-transparent member. In FIG. 7, the portion for permitting light transmission is indicated with hatching. On the other hand, the portion for preventing reflection from another portion and light leakage is free from hatching. An upper surface 31a of the transparent display portion 31 serves as the key top.

Each of the elastic portions 33 is formed into an elongated curved shape so as to be elastically deformed owing to depressing force toward the display screen 16a of the transparent display portion 31 so that downward displacement of the transparent display portion 31 is permitted. After the depression force has been suspended, each of the elastic portions 33 is elastically restored to return the transparent display portion 31 to the original upper position.

Three engagement holes 32a are formed in the secured portion 32. When each of the engagement holes 32a is press-fit with the operating engagement pins 29 of the casing body 25, the plural transparent operation plates 24 are secured to the casing 22. The plural transparent operation plates 24 are disposed at the positions correspondingly to the positions above the transparent window portions 26 and the switch bodies 23.

The switch depression portion 34 is disposed at a position lower than the transparent display portion 31, the switch depression portion 34 being disposed above the switch bodies 23.

The other display-screen switches 21 are structured similarly to the display screen switch 20.

In the foregoing structure, various information are selectively displayed on the display screen 16a of the liquid crystal display unit 16 as an image. The image of switch information is displayed at that position on the display screen 16a corresponding to the plural transparent operation plates 24. Images indicating a plurality of switch information displayed on the display screen 16a are transmitted through and displayed on the surface side of the transparent display portion 31 of each of the transparent operation plates 24. The operator views an image of switch information to depress a required transparent display portion 31 of each of the transparent operation plates 24. Thus, the transparent display portion 31 is downwards displaced owing to elastic deformation of the elastic portion 33. Thus, the switch depression portion 34 presses the switch body 23 so that the switch body 23 is operated.

The plate-like casing 22 and the thin-type transparent operation plates 24 are laminated and disposed on the display screen 16a of the liquid crystal display unit 16. During the foregoing operation, the operation for depressing the transparent operation plate 24 causes the switch bodies 23 secured to the casing 22 to be operated. Since the distance from the display screen 16a to the upper surface 31a of the transparent display portion 31 of the transparent operation plate 24 which is the key top is sufficiently short, an image of switch information displayed on the display screen 16a can easily be viewed by the operator.

In the first embodiment, the elastic portion 33 is disposed on either side of the transparent display portion 31. Therefore, a necessity of interposing a restoring device between the transparent operation plate 24 and the casing 22. Since one transparent operation plate 24 is disposed adjacent to the casing 22, the operator is able to easily view an image of switch information displayed on the display screen 16a.

In this embodiment, the plural transparent operation plates 24 and the switch bodies 23 are provided. Therefore, a plurality of inputs are permitted.

Figure 8:
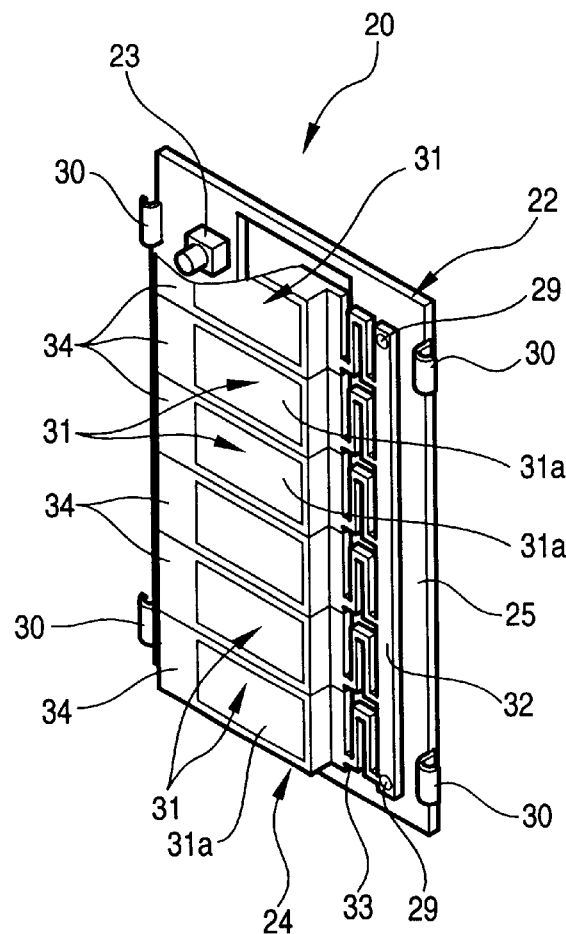
FIG. 8 is a perspective view showing a state of the assembled display screen switch according to a second embodiment of the present invention.
Figure 9:
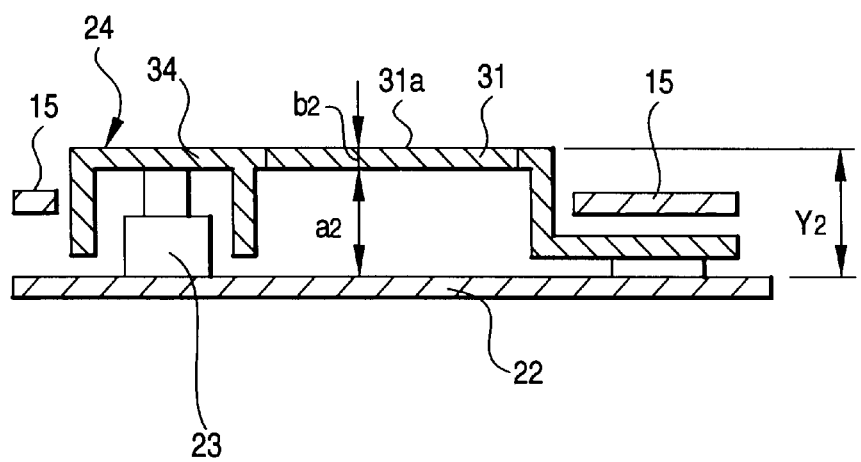
FIG. 9 is a cross sectional view showing the display screen switch according to the second embodiment of the present invention.

A second embodiment of the present invention will now be described. Similarly to the second embodiment, the second embodiment is structured such that the present invention is applied to a display screen switch for an electric apparatus for a vehicle. The same elements as those according to the first embodiment are given the same reference numerals and the same elements are omitted from description. Only different elements will now be described. That is, the two embodiments are different from each other in only a portion of the display screen switch 20. FIG. 8 is a perspective view showing the display screen switch 20. FIG. 9 is a cross sectional view showing the display screen switch 20.

Referring to FIGS. 8 and 9, the switch depression portion 34 is disposed on either side of the transparent display portion 31 similarly to the first embodiment. The switch depression portion 34 is disposed at substantially the same height of the transparent display portion 31. The other structures are the same as those according to the first embodiment.

The second embodiment attains similar effects to those obtainable from the first embodiment. As compared with the first embodiment, the distance from the casing 22 to the transparent display portion 31 can be made to be substantially the same as the height of the switch body 23. Therefore, the distance from the display screen 16a to the upper surface 31a of the transparent display portion 31 of the transparent operation plate 24 which is the key top can furthermore be shortened. Therefore, the operator is able to furthermore easily view an image of switch information displayed on the display screen 16a.

Specifically, as shown in FIG. 4(b), in the first embodiment, an assumption is made that $a_1$ is the height of the switch body 23 and $b_1$ is the sum of the thickness and the clearance of the transparent display portion 31, the thickness of the face cover 15 and an amount of projection of the transparent display portion 31. Distance $Y_1$ from the upper surface of the casing 22 to the upper surface of the transparent display portion 31 is $Y_1 = a_1 + b_1$. In the casing of the second embodiment, as shown in FIG. 9, assuming that the $a_2$ (=$a_1$) is the height of the switch body 23 and $b_2$ is the thickness of the transparent display portion 31, distance $Y_2$ from the upper surface of the casing 22 to the upper surface of the transparent display portion 31 satisfies that $Y_2 = a_2 + b_2$. Thus, the thickness can furthermore be reduced.

Figure 10:
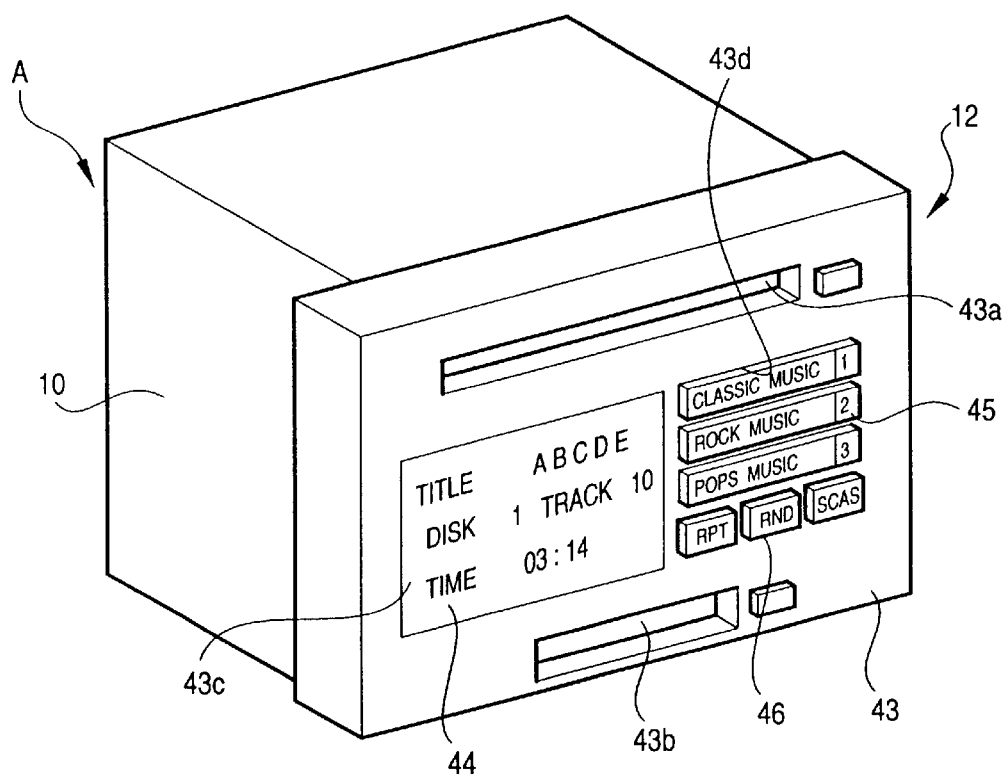
FIG. 10 is a perspective view showing an electric apparatus for a vehicle according to a third embodiment of the present invention.
Figure 11:
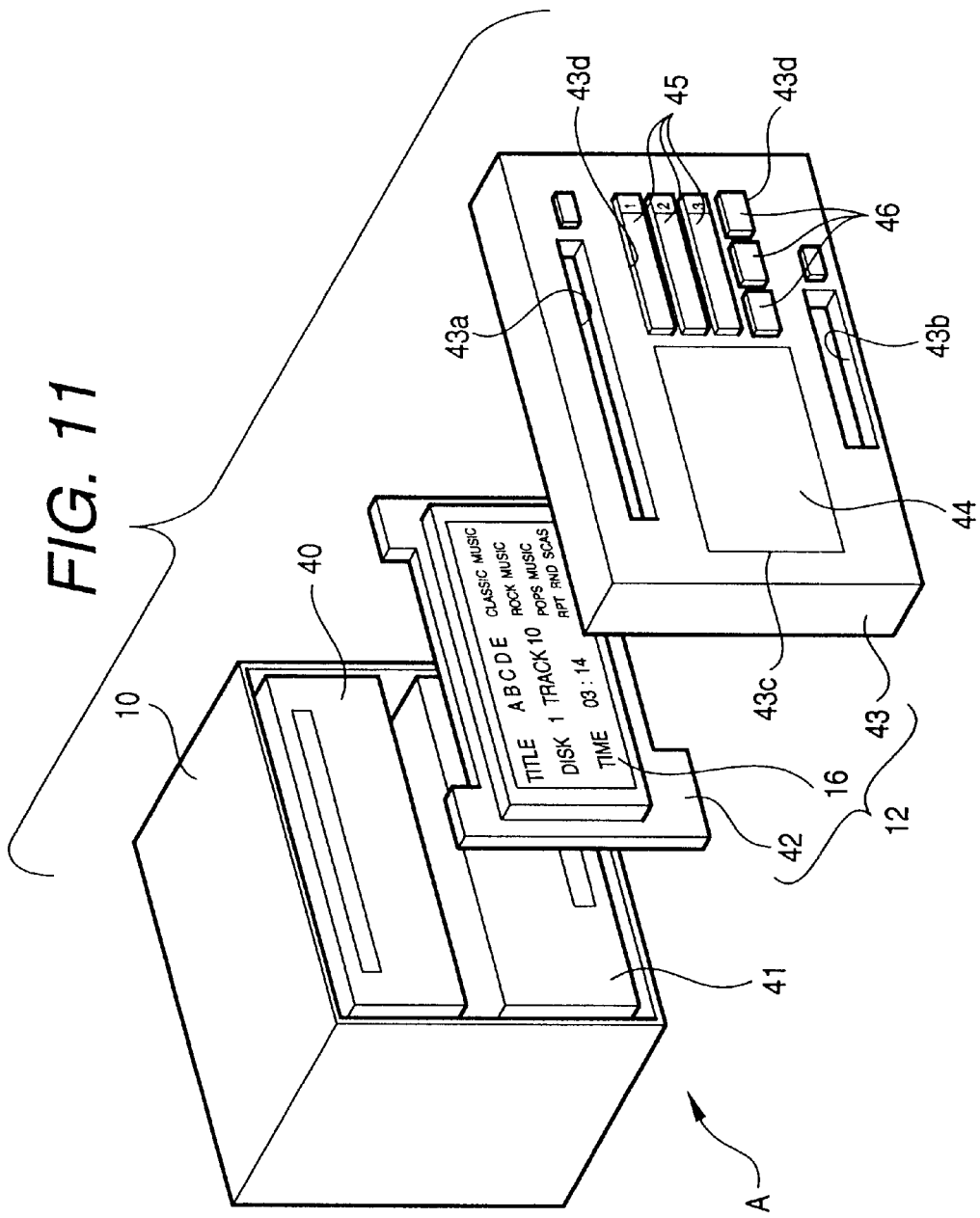
FIG. 11 is an exploded perspective view showing the electric apparatus for a vehicle according to the third embodiment of the present invention.

FIGS. 10 and 11 show a third embodiment of the present invention. In the third embodiment, the present invention is applied to a display screen switch for an electric apparatus for a vehicle. FIG. 10 is a perspective view showing an electric apparatus A for a vehicle. FIG. 11 is an exploded perspective view showing the electric apparatus A for a vehicle. Referring to FIGS. 10 and 11, the metal plate casing 10 accommodates a CD-changer unit 40 and a MD-changer unit 41. The operation panel 12 is secured to the front surface of the metal plate casing 10. The operation panel 12 includes a board 42, the liquid crystal display unit 16 which is a display device secured to the surface of the board 42 and a face portion 43 disposed to cover the front surface of the liquid crystal display unit 16.

The face portion 43 has disc insertion ports 43a and 43b for permitting insertion of a CD and an MD. Moreover, the face portion 43 has an opening 43c for liquid crystal and a plurality of openings 43d for switches. A transparent member 44 is assembled to the opening 43c for liquid crystal. Moreover display screen switch 45 and 46 are assembled to the openings 43d for switches. The structures of the display screen switches 45 and 46 will now be described.

Figure 12:
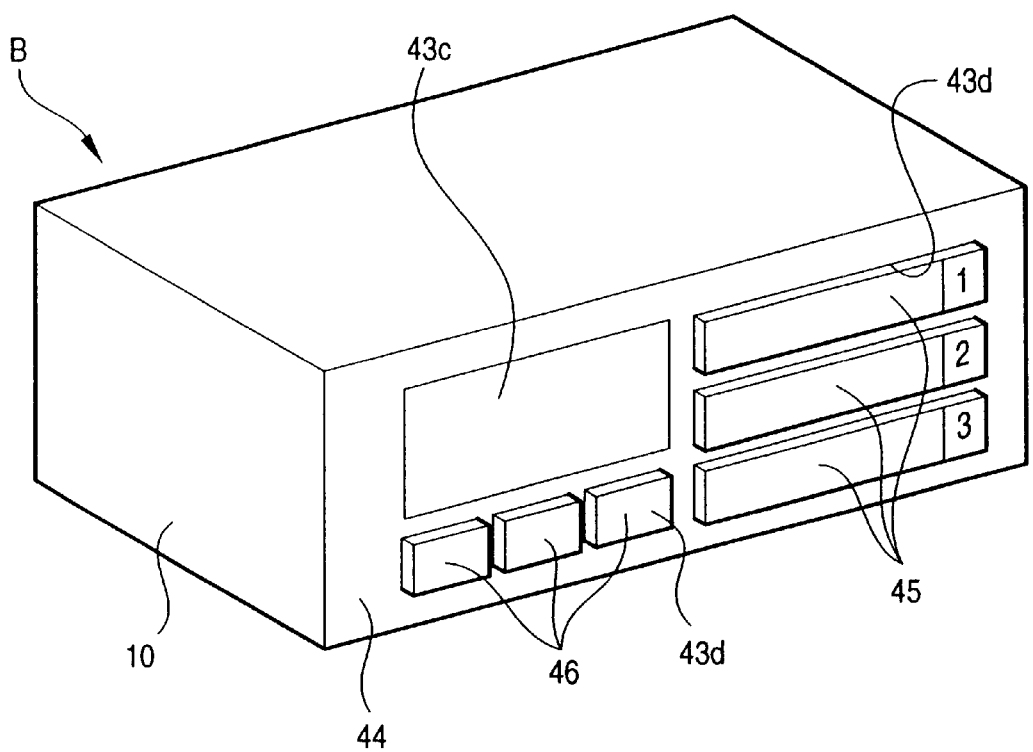
FIG. 12 is a perspective view showing a display unit of an electric apparatus for a vehicle according to a fourth embodiment of the present invention.
Figure 13:
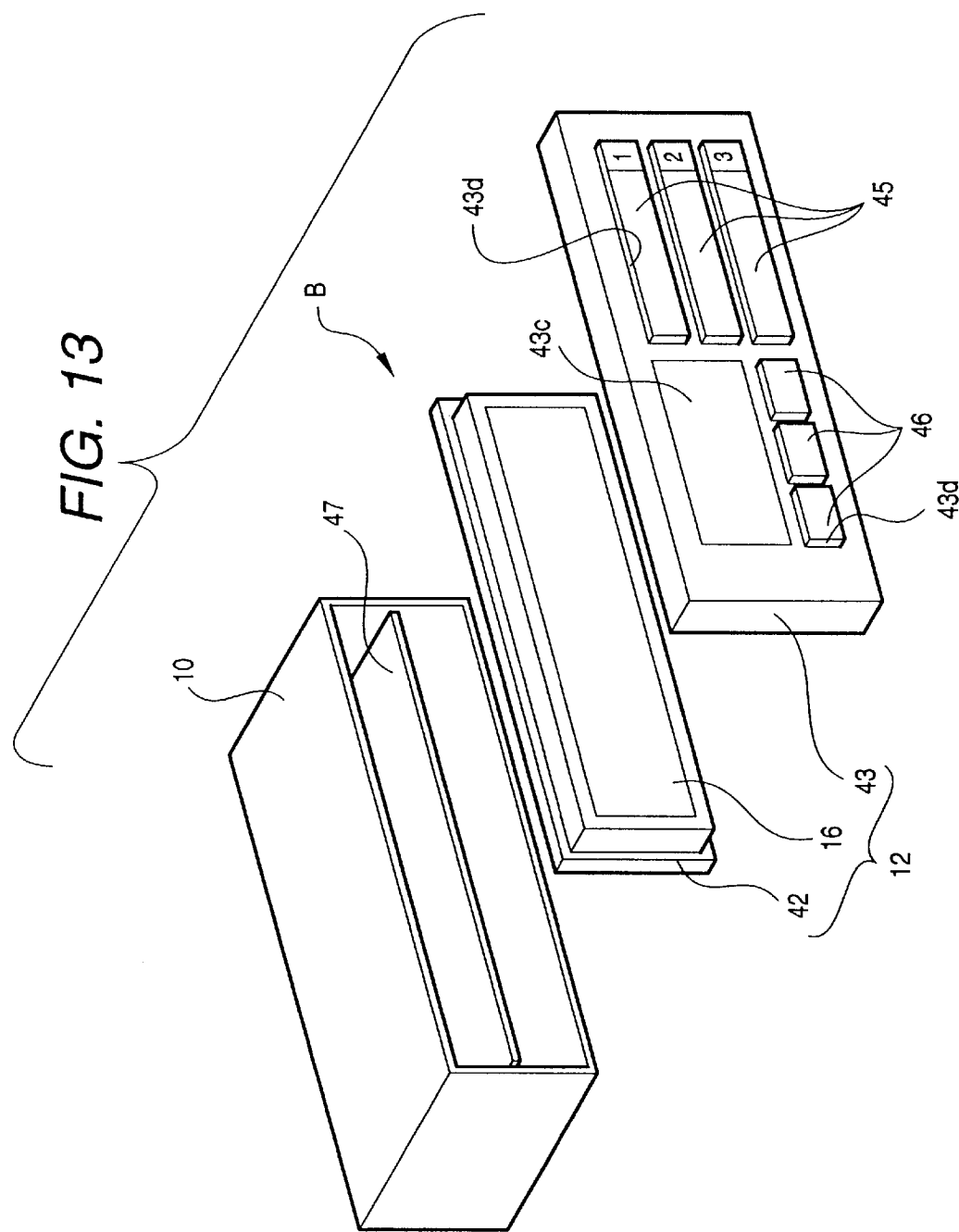
FIG. 13 is an exploded perspective view showing a display unit for an electric apparatus for a vehicle according to the fourth embodiment of the present invention.

FIGS. 12 and 13 show a fourth embodiment of the present invention. Also the fourth embodiment is structured such that the present invention is applied to a display screen switch for an electric apparatus for a vehicle. The fourth embodiment is different from the third embodiment in that the electric apparatus for a vehicle is sectioned into a unit (not shown) which accommodates the CD-changer and the MD-changer and display unit B for displaying, on the display screen, information required for the operation. The unit (not shown) for accommodating the CD-changer and the MD-changer is disposed, for example, below the rear sheet. On the other hand, the display unit B is provided for a position which can be viewed by a driver and operated by the driver.

FIG. 12 is a perspective view showing the display unit B for the electric apparatus for a vehicle. FIG. 13 is an exploded perspective view showing the display unit B of the electric apparatus A for a vehicle. Referring to FIGS. 12 and 13, the metal plate casing 10 accommodates a signal processing substrate 47. The operation panel 12 is secured to the front surface of the metal plate casing 10. Similar to the third embodiment, the operation panel 12 includes a board 42, the liquid crystal display unit 16 which is a display device secured to the surface of the board 42 and a face portion 43 disposed to cover the front surface of the liquid crystal display unit 16.

An opening 43c for liquid crystal and a plurality of openings 43d for switches, which are different in the positions and the size from those according to the third embodiment, are provided for the face portion 43. A transparent member 44 is assembled to the opening 43c for liquid crystal. Display screen switches 45 and 46 are assembled to the openings 43d for switches. The structures of the display screen switches 45 and 46 will now be described.

Figure 14:
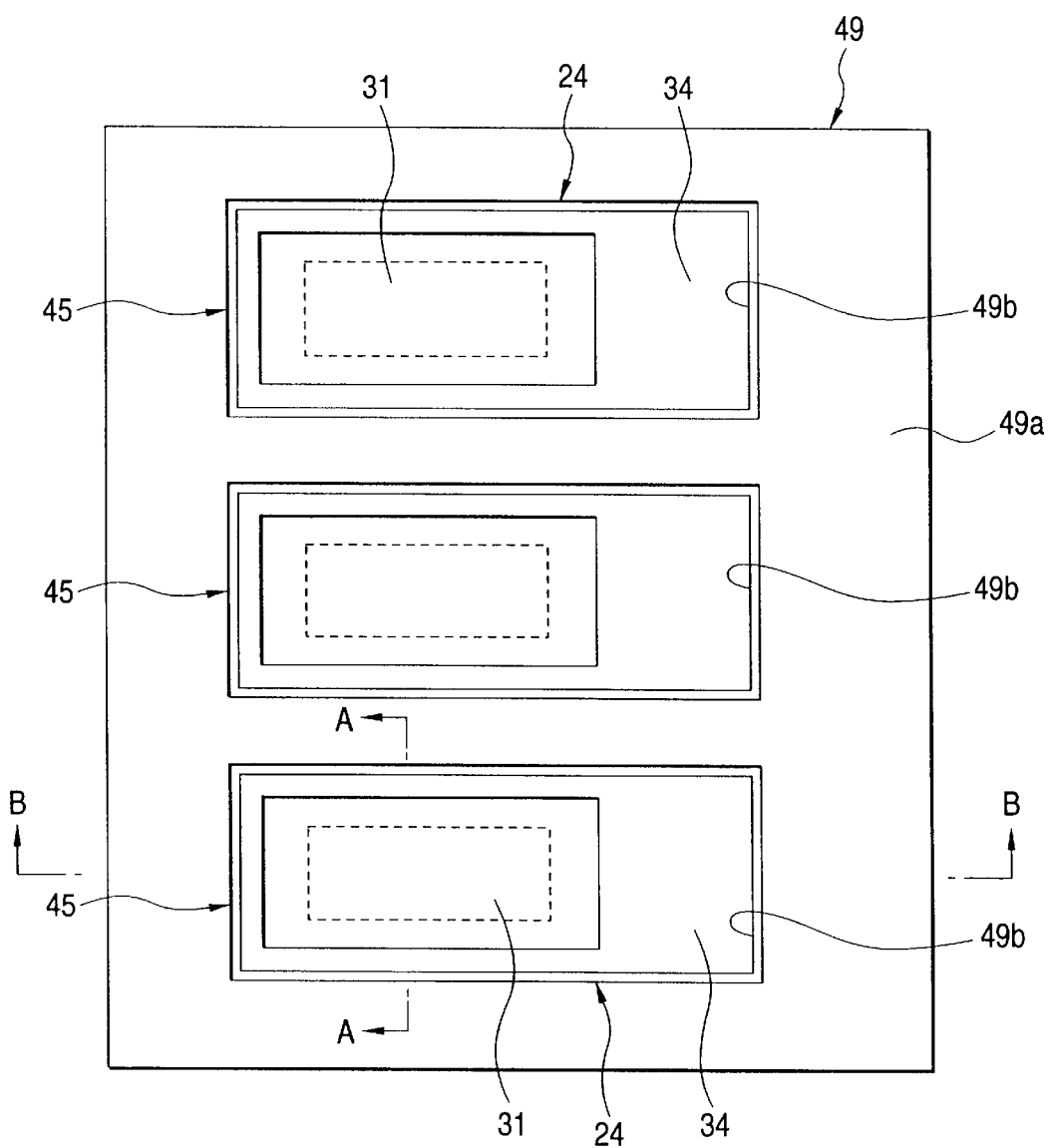
FIG. 14 is a front view showing a display screen switch according to third and fourth embodiments of the present invention.
Figure 15:
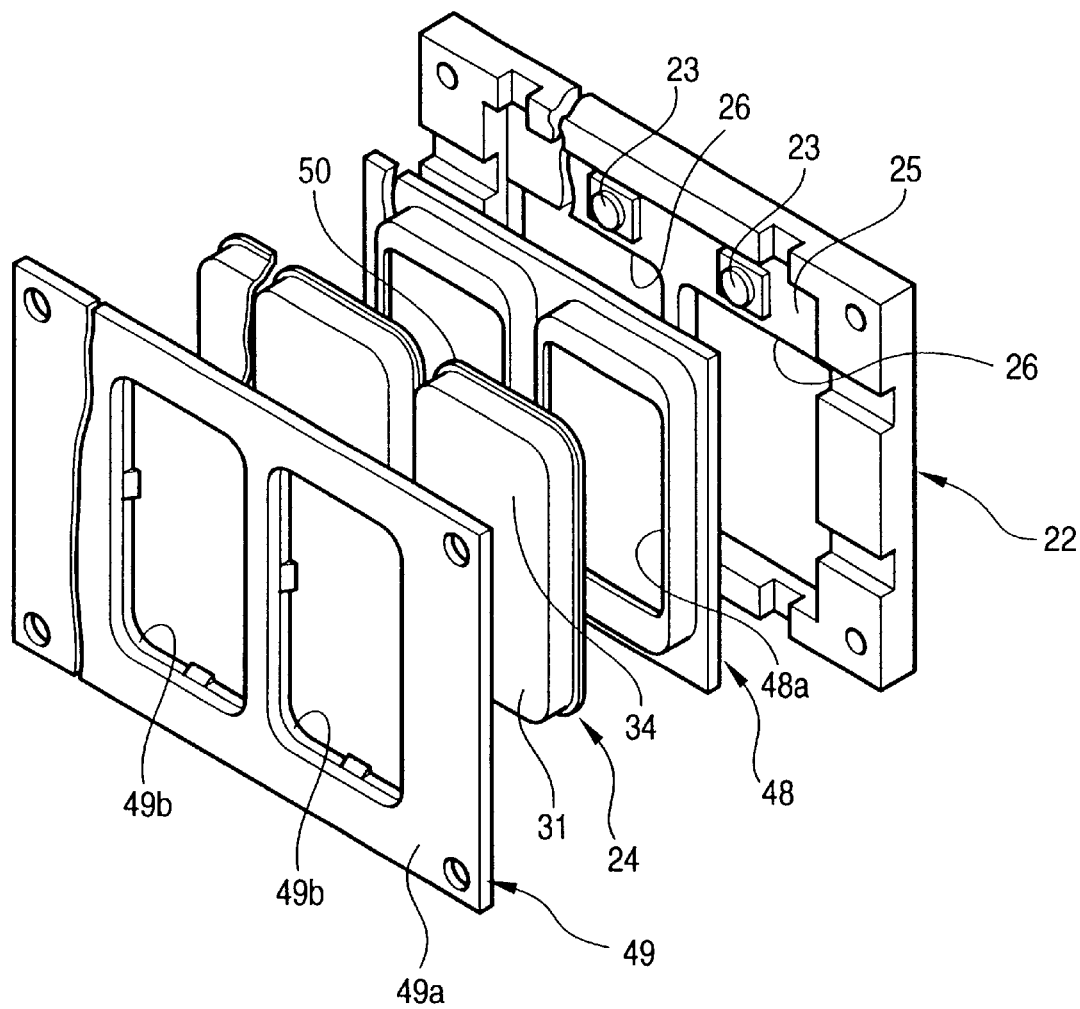
FIG. 15 is an exploded perspective view showing the display screen switch according to the third and fourth embodiments.
Figure 16:
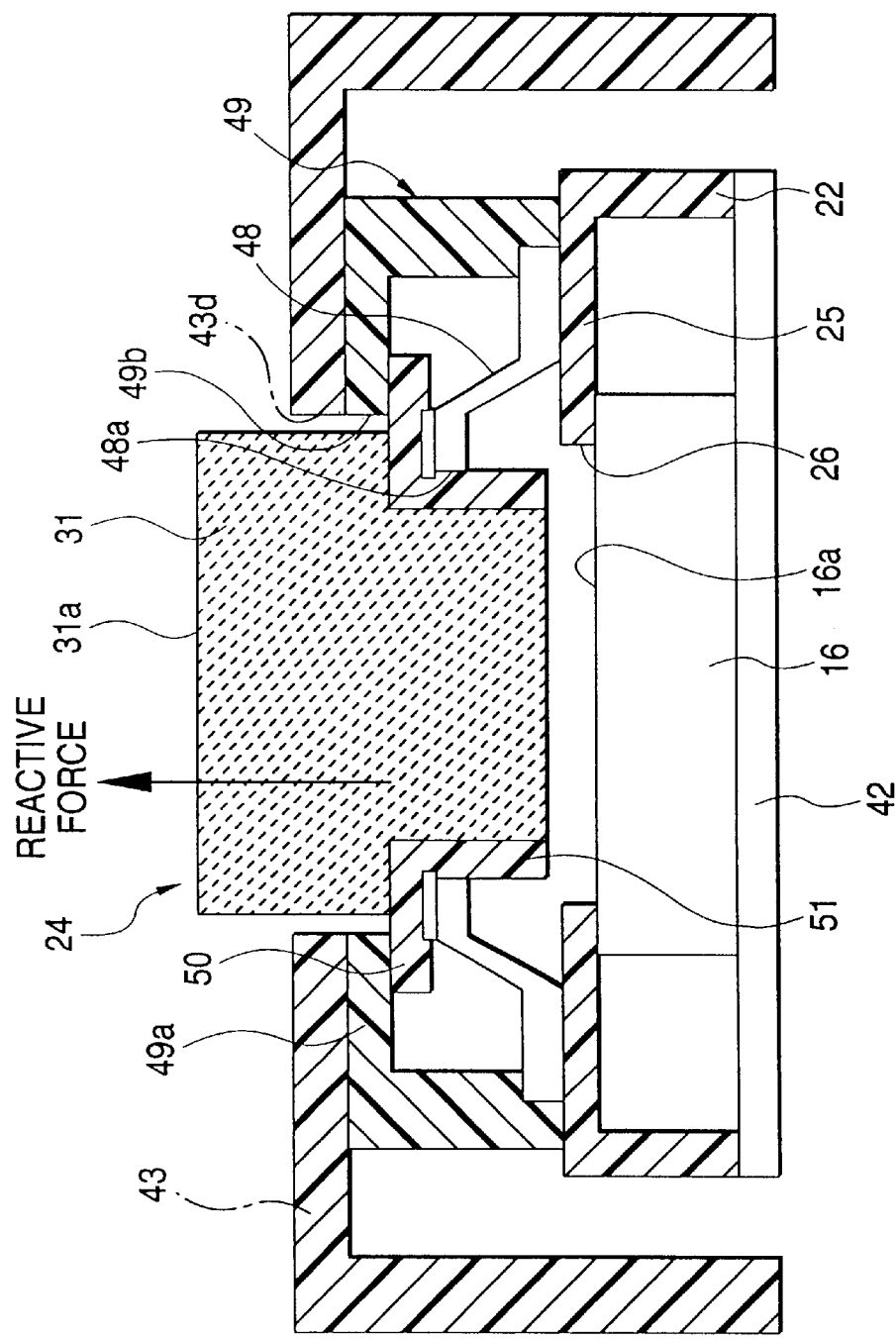
FIG. 16 is an enlarged cross sectional view taken along line A—A shown in FIG. 14.
Figure 17:
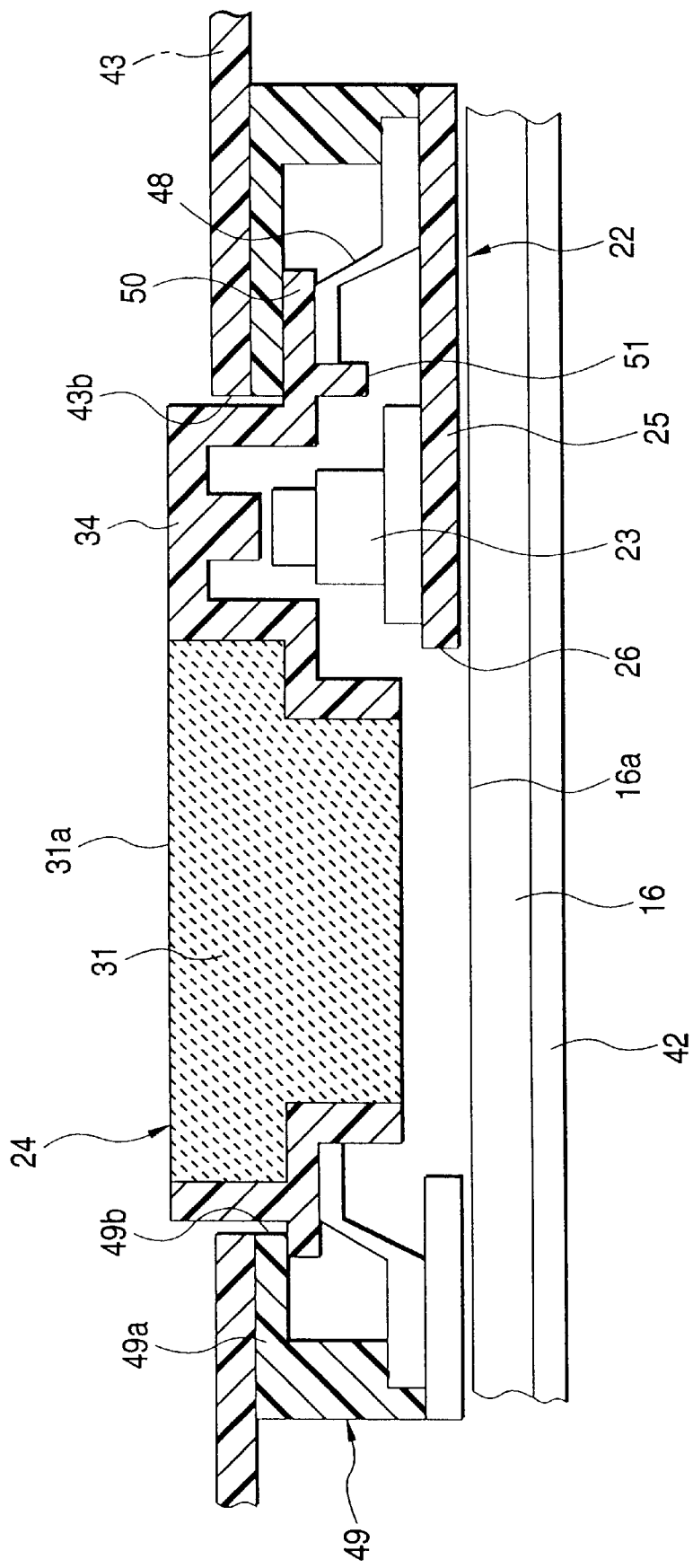
FIG. 17 is a cross sectional view taken along line B—B shown in FIG. 14.

FIG. 14 is a front view showing the display screen switch 45 according to the third and fourth embodiments. FIG. 15 is an exploded perspective view showing the display screen switch 45. FIG. 16 is an enlarged cross sectional view taken along line A—A shown in FIG. 14. FIG. 17 is a cross sectional view taken along line B—B shown in FIG. 14. Referring to FIGS. 14 to 17, the display screen switch 45 includes a plate-like casing 22 disposed on the display screen 16a of the liquid crystal display unit 16; a plurality of switch bodies 23 secured to the casing 22; a plurality of transparent operation plates 24 disposed on the surface side of the casing 22; rubber 48 interposed between the plurality of the transparent operation plates 24 and the casing 22; and a cover 49 for supporting each of the transparent operation plates 24.

The casing 22 includes a plate-like casing body 25 made of ABS resin or polycarbonate resin disposed on the display screen 16a; and a plurality of transparent window portions 26 penetrating the casing body 25 from the surface side to the reverse side and permits transmission of switch displayed on the display screen 16a to the transparent operation plates 24.

The plural switch bodies 23 are secured to positions of the casing body 25 corresponding to the plural transparent window portions 26. Each of the switch bodies 23 has a contact in the form of, for example, a metal contact.

Each of the transparent operation plates 24 includes a transparent display portion 31 which permits transmission and display of switch information; a switch depression portion 34 disposed on either side of the transparent display portion 31; a flange 50 provided for a portion around the transparent display portion 31 and the switch depression portion 34; and an engagement wall 51 downwards extending from the flange 50. The transparent operation plates 24 is made of, for example, methacrylic resin (acrylic resin) or polycarbonate resin.

The transparent display portion 31 may be made of a transparent member to make its overall body to be a transparent structure. In this embodiment, portions except for the transmission portions, that is, the outer surface portion of the transparent display portion 31 is coated in order to prevent reflection of light from another portion and light leakage. A two-tone color structure may be employed in which the portions for permitting light transmission and the other portions are sectioned into a transparent member and a non-transparent member. In FIGS. 16 and 17, the portion for permitting light transmission is indicated with dashed-line hatching. On the other hand, the portion for preventing reflection from another portion and light leakage is indicated with usual hatching for the resin. An upper surface 31a of the transparent display portion 31 serves as the key top.

The rubber 48 is, for example, silicon rubber. A plurality of holes 48a are formed in the upper surface of the rubber 48. An engagement wall 51 of each of the transparent operation plates 24 is inserted into each of the holes 48a. The rubber 48 is engaged to each transparent operation plate 24 owing to its rubber compression pressure.

The cover 49 is made of ABS resin or polycarbonate resin. The cover 49 includes a plate-like cover body 49a and a plurality of openings 49b for the operation plates penetrating the cover body 49a from the surface side and the reverse side. The transparent display portion 31 and the upper portion of the switch depression portion 34 of the transparent operation plate 24 upwards project through each of the openings 49b for the operation plates. That is, the distance from the upper surface of the casing 22 to the lower surface of the cover 49 is slightly shorter than the distance from the lower surface of the rubber 48 to the upper surface of the flange 50 of the transparent operation plate 24. Thus, the transparent operation plate 24 is assembled in a state in which the transparent operation plate 24 is slightly downwards displaced against the elastic force of the rubber 48.

The other display-screen switches 46 are structured similarly to the display screen switch 45.

In the foregoing structure, various information are selectively displayed on the display screen 16a of the liquid crystal display unit 16 as an image. An image of switch information is displayed at that position on the display screen 16a correspondingly to the plural transparent operation plates 24. Images indicating a plurality of switch information displayed on the display screen 16a are transmitted through and displayed on the surface side of the transparent display portion 31 of each of the transparent operation plates 24. The operator views an image of switch information to depress a required transparent display portion 31 of each of the transparent operation plates 24. Thus, the switch depression portion 34 is downwards displaced owing to elastic deformation of the rubber 48. Therefore, the switch depression portion 34 presses the switch body 23 so that the switch body is operated.

The plate-like casing 22 and the thin-type transparent operation plates 24 are laminated and disposed on the display screen 16a of the liquid crystal display unit 16. During the foregoing operation, the operation for depressing the transparent operation plate 24 causes the switch bodies 23 secured to the casing 22 to be operated. Since the distance from the display screen 16a to the upper surface 31a of the transparent display portion 31 of the transparent operation plate 24 which is the key top is short, an image of switch information displayed on the display screen 16a can easily be viewed by the operator.

Figure 18:
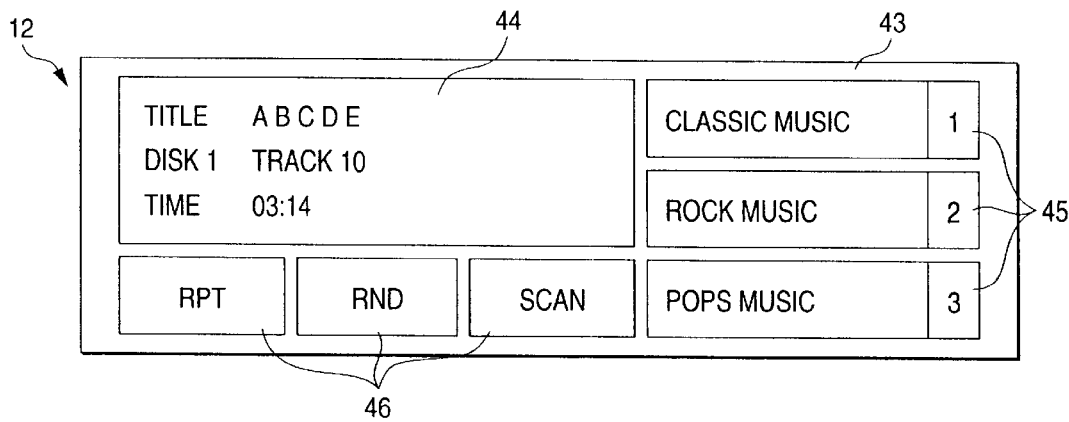
FIG. 18(a) is a diagram showing a state of display of a screen in a 3-disc MD changer mode, 18(b) is a diagram showing a state of display of a screen in the 3-disc CD changer mode and 18(c) is a diagram showing a state of display of a screen in a multiple teletext mode.
Figure 18:
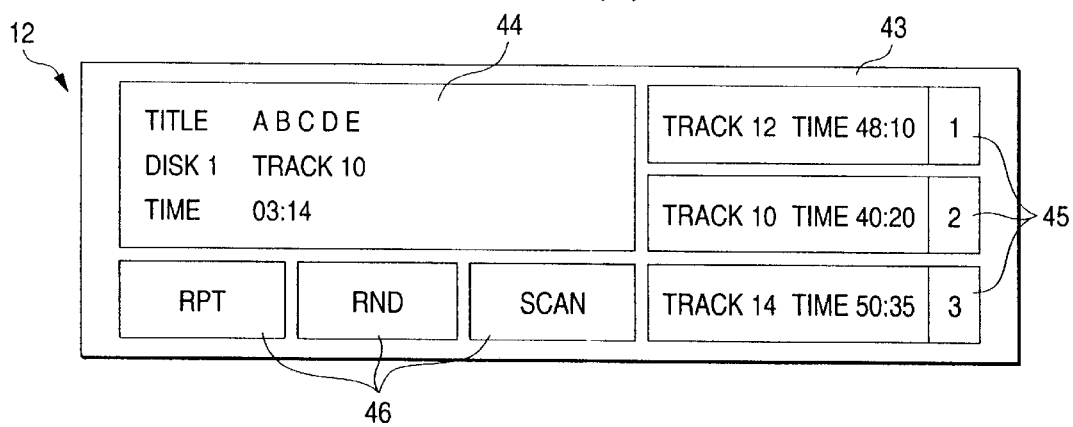
Figure 18:
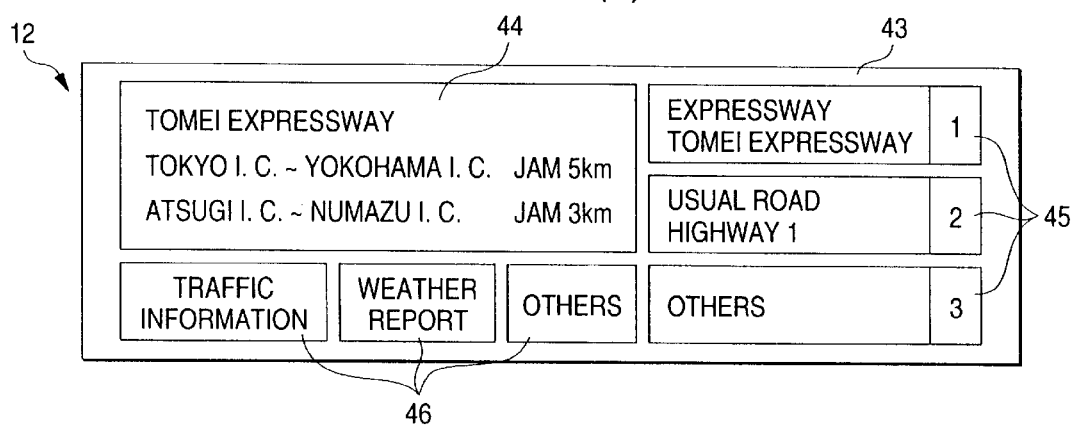
Figure 19:
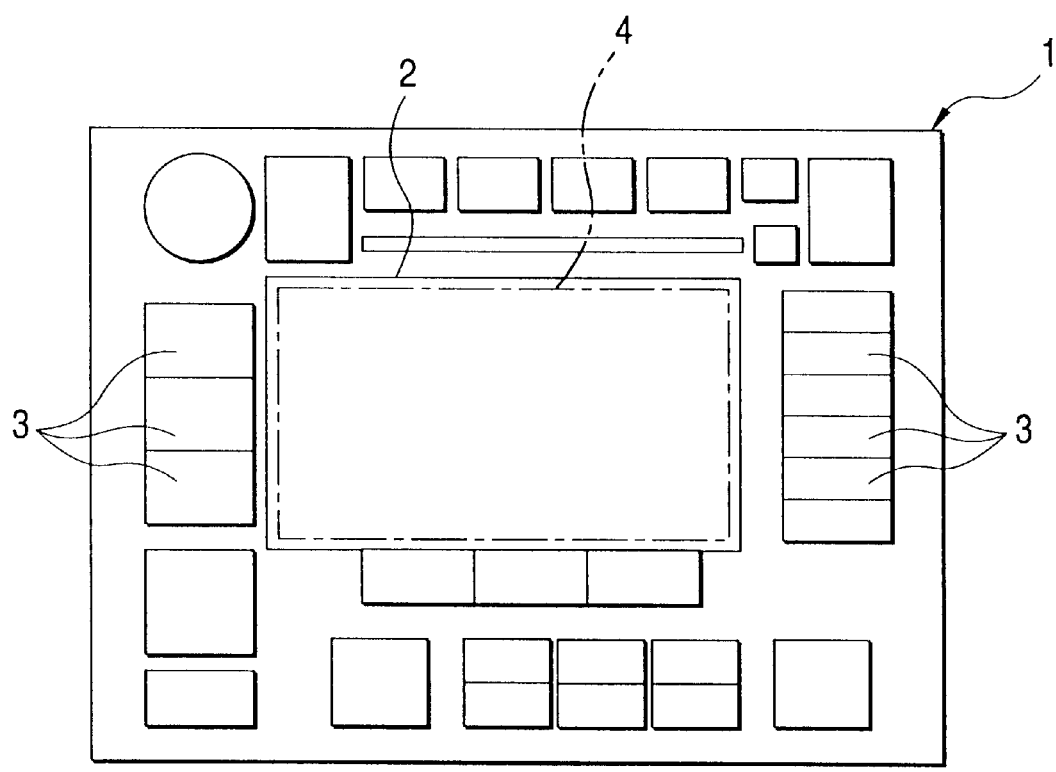
FIG. 19 is a front view showing a related electric apparatus for a vehicle.
Figure 20:
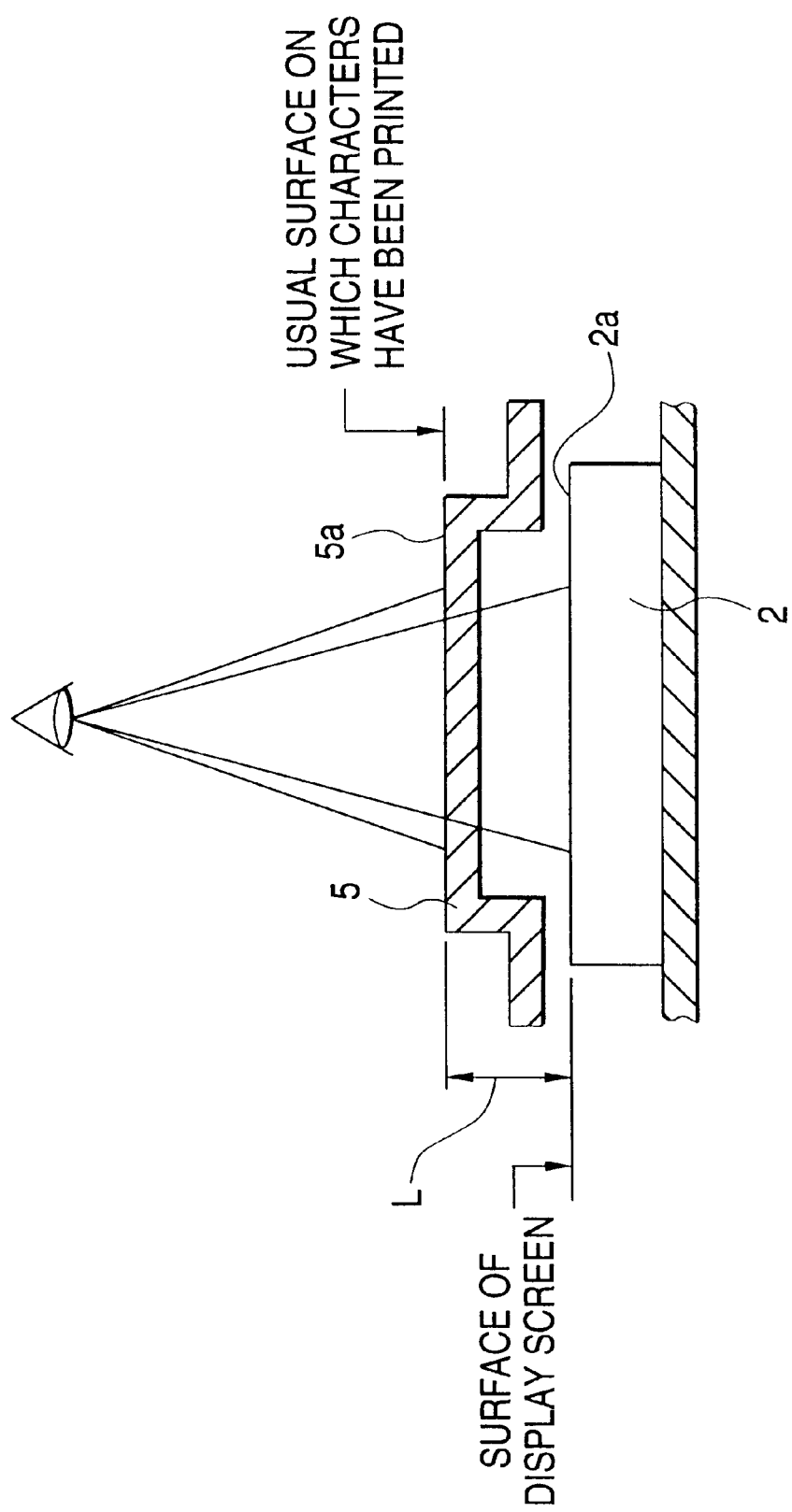
FIG. 20 is a schematic cross sectional view showing a fact that an image indicating switch information displayed on the display screen is not legible in a casing of a related display-screen switch, including a transparent operation member and a contact-type switch.

In the third and fourth embodiments, when the switch depression portion 34 of the transparent operation plate 24 is depressed, the rubber 48 is elastically deformed in the downward direction. Thus, the switch body 23 is operated. When depression of the switch depression portion 34 is interrupted, elastic restoring deformation of the rubber 48 is restored to the original position. The rubber 48 is disposed below the overall outer surface of the transparent operation plate 24. The rubber 48 is made hermetic contact with the transparent operation plate 24 owing to its elastic reactive force. Therefore, introduction of dust and water introduced through the opening 49b for the operation plate of the cover 49 can be prevented. Moreover, the engagement wall 51 is provided for the transparent operation plate 24, the engagement wall 51 being introduced into the hole 48a of the rubber 48. Moreover, the engagement wall 51 is assembled to the transparent operation plate 24 by using the rubber compressive force of the rubber 48. Therefore, a necessity for bonding the transparent operation plate 24 and the rubber 48 to each other by using an adhesive agent or the like can be eliminated. Therefore, a special process, such as integral molding of resin and rubber or the like, is not required. Therefore, the cost can be reduced. Also in a state in which the operator is not depressing the transparent operation plate 24, the rubber 48 always presses the transparent operation plate 24 by the elastic force (reactive force) of the rubber 48. Therefore, separation between the rubber 48 and the transparent operation plate 24 can be prevented. As compared with adhesion realized by using an adhesive force or the like, a problem of separation or the like can be prevented. A method of using the electric apparatus for a vehicle according to the third and fourth embodiments will now be described. The electric apparatus for a vehicle is able to select a mode from a 3-MD change mode, a 3-CD change mode and multiple teletext mode. FIG. 18(a) shows a state of display on the screen in the 3-MD change mode according to the fourth embodiment. FIG. 18(b) shows a state of display on the screen in the 3-CD changer mode according to the fourth embodiment. FIG. 18(c) shows a state of display on the screen in the teletext mode according to the fourth embodiment. Although only the 3-MD changer mode state of display on the screen according to the third embodiment is shown in FIGS. 10 and 11, the same contents are displayed.

That is, in the 3-MD changer mode shown in FIG. 18(a), the three display screen switches 45 are assigned to disc numbers and arranged to serve as selection switches for the assigned discs. When a disc has been injected, the title recorded on the disc is read to display the title at that position on the liquid crystal display unit 16 correspondingly to the display screen switch 45 to which the title has been assigned. The display on the liquid crystal display unit 16 can be viewed through the transparent operation plates 24. The three display screen switches 46 serve as play mode selection switches. The play unction display of each switch is displayed at that position on the liquid crystal display unit 16 correspondingly to each display screen switch 46. The display on the liquid crystal display unit 16 can be viewed through the transparent operation plates 24. A state, such as the song title, which is being played, is displayed at that position on the liquid crystal display unit 16 correspondingly to the transparent member 44.

With the foregoing structure, the display screen switch 45 on which the title is being displayed is depressed so that a required disc can be selected. When the display screen switch 46 which is displaying a playing mode is depressed, a required playing mode can be selected. When the disc has been selected, the title is highlight-displayed. Thus, the title of the song which is being played can be recognized at first sight. FIG. 18(a) shows the display screen switch 45 displaying "CLASSIC MUSIC" is highlight-displayed.

FIG. 18(b) shows the 3-CD changer mode in which the three; display screen switches 45 are assigned to the disc numbers and arranged to serve as selection switches for the selected discs. When another disc is loaded, the number of tracks and the total play time recorded on the loaded disc are read. Then, the number of tracks and the total play time are displayed at that position on the liquid crystal display unit 16 correspondingly to the display screen switch 45 to which the number of tracks and the total play time. The display on the liquid crystal display unit 16 can be viewed through the transparent operation plate 24. The other structures are similar to the casing for the 3-MD changer mode. Therefore, the similar structures are omitted from description.

With the foregoing structure, the display screen switch 45 which is displaying the number of tracks and the total play time is depressed, a required disc can be selected. When the display screen switch 46 which is displaying the play mode is depressed, a required play mode can be selected. When a disc has been selected, the display of the number of tracks and the total play time are highlight-displayed. Thus, the title of the music which is being played can be recognized at first sight.

FIG. 18(c) shows the multiple teletext mode in which the three display screen switches 45 and 46 are assigned to information fields and the specific titles after characteristic information, such as FM-multiple broadcast. Moreover, the display screen switches 45 and 46 serve as selection switches for the assigned information fields and the titles. Specific information (the contents) of the selected title or the like is displayed as an image at that position on the liquid crystal display unit 16 correspondingly to the transparent member 44.

With the foregoing structure, the display screen switches 45 and 46 which are displaying the title are depressed, required characteristic information can be viewed through the transparent member 44. The selected field and title are highlight-displayed, that is, the field and title which are being displayed can be recognized at first sight.

That is, the related electric apparatus, such as the MD-changer or the CD-changer, which permits insertion of a plurality of types of discs is operated to reproduce a required disc owing to the memory of the user or the tittle of the disc which is displayed when the disc number has been selected. To overcome the foregoing problem, a structure has been suggested (see Unexamined Japanese Patent Publication No. Hei. 5-182430) in which the titles of the inserted discs are, in a sectioned manner, displayed on the display screen. Moreover, a switch disposed adjacent to the display is selected to permit selection of a required disc. However, the electric apparatus for use in a vehicle requires an excessively long operation time to confirm the title displayed on the display screen and select the switch of the corresponding number. Therefore, time for which the driver takes the eyes off the forward when the driver drives the vehicle is elongated. Therefore, a problem arises from a safety standpoint.

The electric apparatus according to the third and fourth embodiments is structured such that the titles of the discs in the MD-changer and the CD-changer are displayed on the display screen switch 45. Therefore, when a driver has confirmed the title of a required disc, the driver is required to select the display screen switch 45 which is displaying the title. Therefore, time required to operate the apparatus can be shortened and time for which the driver takes the eyes off the forward required to drive the vehicle can be shortened. Therefore, an satisfactory effect can be obtained from the safety standpoint. That is, when a disc is selected, the related apparatus requires the driver to move the line of sight two times. The present invention does not require movement of the line of sight.

Since a multi-function switch can be realized, increase in the number of the switches is not required when the function of the MD-changer, the CD-changer or a radio has been added. Since the display screen switches 45 and 46 are able to correspond to the increased function, time required to recognize the switch can be shortened. Also the foregoing viewpoint, safety can be improved.

The first and second embodiments have the structure that the display screen switch 20 is formed into a module unit. Moreover, the engagement claws 30 are provided and corresponding engagement grooves (not shown) are provided for the corresponding face cover 15. Therefore, the display screen switch 20 can easily be assembled.

Although each embodiment has the structure that the present invention is applied to the display screen switches 20 and 21, the present invention may, of course, be applied to a display screen switch except for the electric apparatus for a vehicle.

Although the liquid crystal display unit 16 is employed as the display device in each embodiment, the display device may comprise a cathode ray tube or the like if the employed display device is able to display an image of various information on the display screen.

Although the elastic member according to the third and fourth embodiments is the rubber 48, another member may be employed if the member attains elastic reactive force with which hermetic contact with the lower surface of the transparent operation plate 24 is permitted.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

What is claimed is:

1. A switch disposed above a display device that includes a display screen and is capable of displaying on the display screen an image that indicates various information comprising switch information, the switch comprising:
   a casing disposed above a display screen and having a circuit, the casing including:
      a plate-like casing body disposed on the display screen, and
      a transparent window portion formed to penetrate the casing body from a surface side to a reverse side thereof;
   a switch body disposed on the casing body, the switch body being connected to the circuit; and
   a transparent operation plate disposed above the surface side of the casing body, the transparent operation plate being depressed so as to operate the switch body,
   wherein an image of switch information displayed on the display screen is transmitted to the transparent operation plate through the transparent window portion of the casing.

2. The switch of claim 1, wherein the transparent operation plate includes:
   a transparent display portion wherein the image of the switch information displayed on the display screen is transmitted through and also displayed on the transparent display portion,
   a secured portion disposed on one side of the transparent display portion and secured to the casing body,
   an elastic portion disposed between the secured portion and the transparent display portion, and
   a switch depression portion disposed on the other side of the transparent display portion and disposed above the switch body.

3. The switch of claim 1, wherein a plurality of the transparent window portions are provided in the casing body, a plurality of the transparent operation plates corresponding to the plural transparent window portions are integrally formed together, and a plurality of the switch bodies arranged to be operated by the plural transparent operation plates are provided.

4. The switch of claim 2, wherein the switch depression portion and the transparent display portion are substantially same in height from the casing body.

5. The switch of claim 1, wherein the transparent operation plate includes:
   a transparent display portion wherein the image of the switch information is transmitted through and displayed on the transparent display portion,
   a switch depression portion disposed on one side of the transparent display portion and disposed above the switch body, and
   a flange portion formed around the transparent display portion and the switch depression portion,
   the switch further comprises:
      a cover disposed above the casing wherein the transparent operation plate is disposed between the cover and the casing while the transparent display portion and the switch depression portion are projected through an opening for the operation plate of the cover; and
      an elastic member is interposed between the transparent operation plate and the casing around the transparent operation plate, wherein the elastic member is brought into hermetic contact with the transparent operation plate due to elastic reactive force of the elastic member.

* * * * *